US012726948B1

(12) United States Patent
OBoyle et al.

(10) Patent No.: US 12,726,948 B1
(45) Date of Patent: Sep. 1, 2026

(54) METHOD AND WIRELESS DEVICE FOR PERFORMING CONTROL CHANNEL SELECTION WITHIN A DYNAMIC FREQUENCY SELECTION (DFS) AVOIDANCE SYSTEM

(71) Applicant: Amazon Technologies, Inc., Seattle, WA (US)

(72) Inventors: Reid Andrew OBoyle, Howell, MI (US); Alexandra Calkins Katague, San Francisco, CA (US); Sudheer Kumar Suryadevara, San Jose, CA (US); Karim Abulmakarem Khalil, Santa Clara, CA (US); Qiong Wu, Oakland, CA (US); Yogesh Reddy Kondareddy, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 424 days.

(21) Appl. No.: 18/542,357

(22) Filed: Dec. 15, 2023

Related U.S. Application Data

(60) Provisional application No. 63/542,852, filed on Oct. 6, 2023.

(51) Int. Cl.
*H04W 28/02* (2009.01)
*H04B 1/00* (2006.01)
(Continued)

(52) U.S. Cl.
CPC ............ *H04W 72/02* (2013.01); *H04B 1/001* (2013.01); *H04B 1/0035* (2013.01);
(Continued)

(58) Field of Classification Search
CPC . H04B 1/001; H04B 1/0035; H04W 28/0231; H04W 72/1226; H04W 72/54
See application file for complete search history.

(56) References Cited

U.S. PATENT DOCUMENTS

2004/0156336 A1* 8/2004 McFarland ........... H04W 12/06 370/341
2010/0226319 A1* 9/2010 Hasegawa ........... H04W 72/542 370/329
(Continued)

OTHER PUBLICATIONS

ETSI, “EN 301 893 V2.1.1”, May 2017, pp. 1-135 (Year: 2017).*

*Primary Examiner* — Salvador E Rivas
(74) *Attorney, Agent, or Firm* — K&L Gates LLP

(57) ABSTRACT

Technology for selecting a control channel is described. Historical radar event data associated with one or more dynamic frequency selection (DFS) channels is used to determine a first score and a second score for a first set and a second set of channels, respectively. The first and second scores are used to determine that a radar event is less likely to occur on the first set than the second set of channels. A bonded channel is selected to include the combination of channels on which a radar event is less likely to occur. Historical interference data is used to determine a third score for a first channel of a bonded channel that includes at least the first set of channels. The third score is used to determine a control channel from the channels of the bonded channel. Management information associated with the bonded channel is sent on the control channel.

20 Claims, 8 Drawing Sheets

DETERMINE, USING FIRST DATA REPRESENTING HISTORICAL RADAR EVENTS HAVING OCCURRED ON ONE OR MORE DYNAMIC FREQUENCY SELECTION (DFS) CHANNELS WITHIN EACH OF A PLURALITY OF BONDED CHANNELS, A FIRST SCORE FOR A FIRST BONDED CHANNEL 302

DETERMINE, USING THE FIRST DATA, A SECOND SCORE FOR A SECOND BONDED CHANNEL 304

DETERMINE, USING THE FIRST SCORE AND THE SECOND SCORE, THAT A RADAR EVENT IS LESS LIKELY TO OCCUR WITHIN THE FIRST BONDED CHANNEL THAN THE SECOND BONDED CHANNEL 306

DETERMINE, USING SECOND DATA REPRESENTING AMOUNTS HISTORICAL INTERFERENCE OCCURRING ON EACH SEGMENT WITHIN EACH OF THE PLURALITY OF BONDED CHANNELS, A THIRD SCORE FOR A FIRST CHANNEL OF THE FIRST BONDED CHANNEL 308

IDENTIFY, USING THE THIRD SCORE, A CHANNEL OF ONE OF THE PLURALITY OF BONDED CHANNELS FOR A CONTROL CHANNEL FOR A THIRD BONDED CHANNEL COMPRISING THE FIRST BONDED CHANNEL AND THE SECOND BONDED CHANNEL 310

(51) Int. Cl.

| | |
|---|---|
| ***H04W 72/02*** | (2009.01) |
| ***H04W 72/0453*** | (2023.01) |
| ***H04W 72/54*** | (2023.01) |
| ***H04W 72/541*** | (2023.01) |
| *H04W 84/12* | (2009.01) |

(52) U.S. Cl.

CPC ... *H04W 28/0231* (2013.01); *H04W 72/0453* (2013.01); *H04W 72/54* (2023.01); *H04W 72/541* (2023.01); *H04W 84/12* (2013.01)

(56) References Cited

U.S. PATENT DOCUMENTS

| | | | | |
|---|---|---|---|---|
| 2012/0258749 | A1* | 10/2012 | Lenzini | H04W 16/14 455/509 |
| 2019/0246324 | A1* | 8/2019 | Cizdziel | H04W 16/14 |

* cited by examiner

DETERMINE, USING FIRST DATA REPRESENTING HISTORICAL RADAR EVENTS HAVING OCCURRED ON ONE OR MORE DYNAMIC FREQUENCY SELECTION (DFS) CHANNELS WITHIN EACH OF A PLURALITY OF BONDED CHANNELS, A FIRST SCORE FOR A FIRST BONDED CHANNEL 302

DETERMINE, USING THE FIRST DATA, A SECOND SCORE FOR A SECOND BONDED CHANNEL 304

DETERMINE, USING THE FIRST SCORE AND THE SECOND SCORE, THAT A RADAR EVENT IS LESS LIKELY TO OCCUR WITHIN THE FIRST BONDED CHANNEL THAN THE SECOND BONDED CHANNEL 306

DETERMINE, USING SECOND DATA REPRESENTING AMOUNTS HISTORICAL INTERFERENCE OCCURRING ON EACH SEGMENT WITHIN EACH OF THE PLURALITY OF BONDED CHANNELS, A THIRD SCORE FOR A FIRST CHANNEL OF THE FIRST BONDED CHANNEL 308

IDENTIFY, USING THE THIRD SCORE, A CHANNEL OF ONE OF THE PLURALITY OF BONDED CHANNELS FOR A CONTROL CHANNEL FOR A THIRD BONDED CHANNEL COMPRISING THE FIRST BONDED CHANNEL AND THE SECOND BONDED CHANNEL 310

FIG. 3

METHOD AND WIRELESS DEVICE FOR PERFORMING CONTROL CHANNEL SELECTION WITHIN A DYNAMIC FREQUENCY SELECTION (DFS) AVOIDANCE SYSTEM

CROSS-REFERENCE TO RELATED APPLICATIONS

This application claims the benefit of U.S. Provisional Application No. 63/542,852, filed Oct. 6, 2023, the entire contents of which are incorporated by reference.

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3 illustrates a method of selecting a control channel, according to one embodiment.

DETAILED DESCRIPTION

Figure 1:
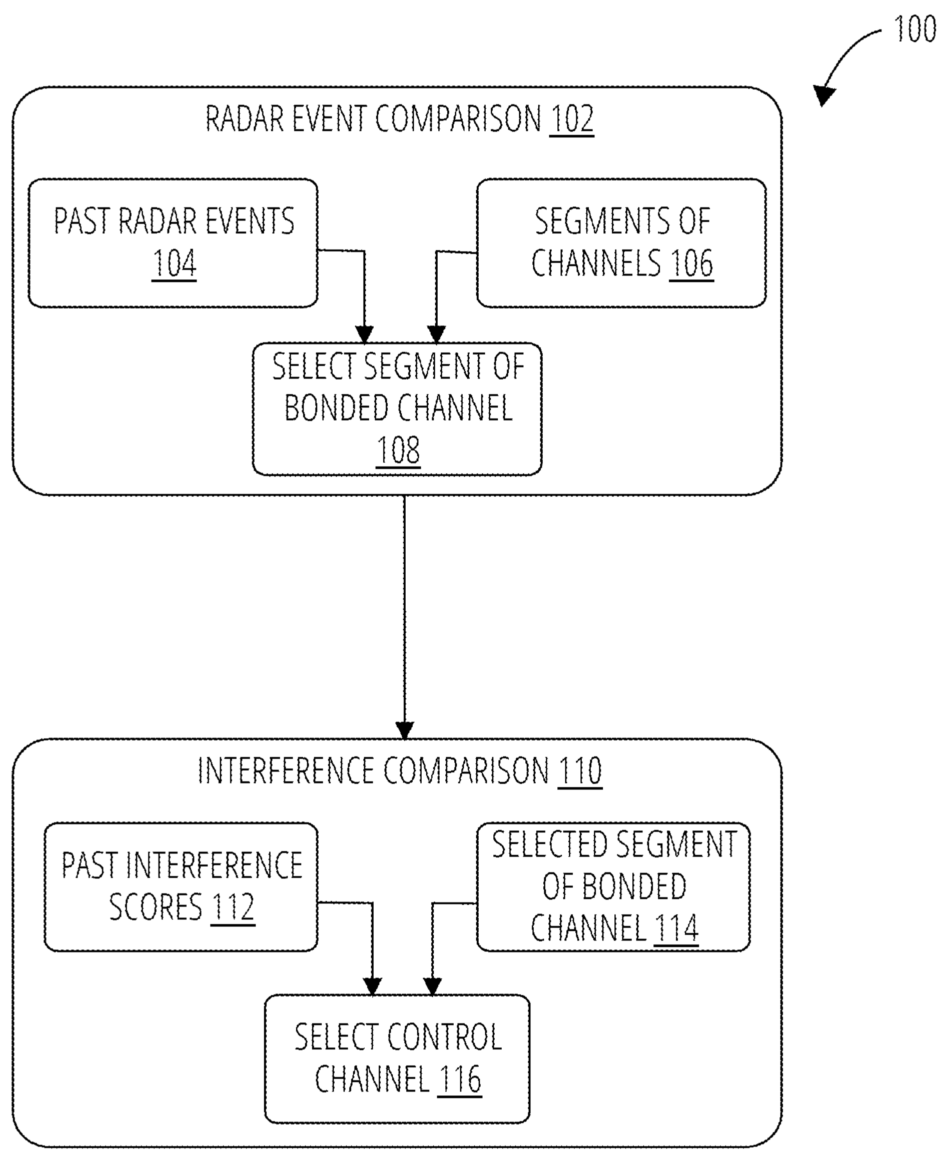
FIG. 1 is a block diagram that illustrates a control channel selection process, according to one embodiment.

Technologies directed to control channel selection are described. The 2.4 GHz and 5 GHz industrial, scientific, and medical (ISM) radio bands allow unlicensed wireless communications. Due to its unlicensed nature, many short-ranged, low-power wireless communication systems operate in these frequency bands. As such, there is a limited delicense spectrum in various locations (e.g., 2.4 GHz ISM and 5 GHz U-NII bands). Various devices are described herein that include wireless local area network (WLAN) radios that operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing MIMO and bandwidths from 20 MHz to 40 MHz. The radios can see all 5.x GHz channels, including DFS channels, and operate at an Equivalent Isotopically Radiated Power (EIRP) up to 36 dBmi, depending on the channel. Unless otherwise noted in the present disclosure, a channel (DFS channel or non-DFS channel) has a bandwidth of 20 MHz. DFS channels are shared between WLANs (e.g., Wi-Fi® networks), government entities, and other wireless systems that pre-date the WiFi® wireless standards. WLANs can use DFS channels but must forfeit the channel if a government agency starts using them. For example, wireless devices with DFS functionality can detect government use from radar pulses indicating the required departure of a DFS channel. For an explanation of DFS Avoidance, the radar pulse indications are referred to herein as "radar event," "strike," or "radar strike."

A WLAN device may determine a bandwidth configuration (e.g., 160 MHz bandwidth, 240 MHz bandwidth). Once the bandwidth configuration is decided, the WLAN device may determine a bonded channel that has a bandwidth that matches the bandwidth configuration. A bonded channel is a combination of multiple channels merged through channel bonding. A bonded channel is merged to increase the bandwidth and achieve greater data transmission rates than a single discrete channel can provide.

DFS channels may be desirable as control channels because they generally have less interference (e.g., noise, less wireless devices transmitting data) than non-DFS channels. A control channel is used to transmit protocol or signal information between wireless network nodes and is a key component of wireless networking. The control channel is used by a wireless device, such as a router, to coordinate other wireless devices sending or receiving information within the bonded channel by sending management information such as management frames, signal frames, synchronization information, control messages, handoff management, security protocols, Quality of Service (QoS) management, and resource allocation. Conventional automatic channel selection (ACS) algorithms do not take into account historical radar strikes on DFS channels when selecting a DFS channel to be a control channel. This is because conventional DFS avoidance techniques caused a total loss of Wi-Fi® network bandwidth upon detecting a radar strike. However, with progressive DFS avoidance, choosing a DFS channel to be a control channel has become more important as Wi-Fi® network bandwidth may shrink or expand around the control channel upon detecting (or not detecting) radar strikes. However, if a radar strike is detected on the control channel, the Wi-Fi® network temporarily loses all bandwidth—the same as past DFS avoidance techniques. For example, if a radar strike is detected on the control channel, the Wi-Fi® network may switch to a new bonded channel with a new control channel. Switching bonded channels takes time and disrupts data flow within the Wi-Fi® network. Thus, for progressive DFS avoidance, choosing a control channel unlikely to experience a radar strike is important.

Aspects and embodiments of the present disclosure address the above and other deficiencies by providing logic that, when selecting a channel, considers (i) a history of DFS radar strikes and (ii) a history of interference within individual channels. Aspects and embodiments of the present disclosure learn from historical activity on DFS channels in a wireless network to improve control channel selection for wireless radios. Aspects and embodiments of the present disclosure can allow wireless devices to make better decisions on what channel to use as a control channel by using radar strike history, maximizing time within a bonded channel by using a DFS channel less likely to experience a radar strike as a control channel.

Aspects and embodiments of the present disclosure determine a first score for a first combination of channels. A second score for a second combination of channels is also determined. The first and second scores may represent historical radar events having occurred on one or more DFS channels within each of the first and second combination of channels, respectively. The first and second combination of channels may include both DFS channels and non-DFS channels. The first and second scores are used to determine which combination of channels is less likely to experience a radar strike. In other words, the first and second scores are used to determine that a radar event (e.g., radar strike) is less likely to happen on either the first combination of channels or the second combination of channels. A third score may then be determined that represents historical interference occurring on a channel of the combination of channels less likely to experience a radar strike. The third score may then be used to identify or select a control channel.

FIG. 1 is a block diagram that illustrates control channel selection 100, according to one embodiment. The control channel selection 100 can include hardware, software, firmware, or any combination thereof to perform control channel selection based on radar data and interference data. The control channel selection 100 may include radar event comparison 102 and interference comparison 110. The radar event comparison 102 and the interference comparison 110 can be implemented by processing logic. Processing logic may include hardware, software, firmware, or any combination thereof to perform the respective operations of the radar event comparison 102 and interference comparison 110 as described below. In some embodiments, as depicted in FIG. 1, the operations of the radar event comparison 102 may be performed before the operations of the interference comparison 110. However, in other embodiments, the operations of the interference comparison 110 may be performed before the operations of the radar event comparison 102. In some embodiments, a hybrid of radar event comparison 102 and interference comparison 110 may be performed concurrently.

The radar event comparison 102 takes into account past radar events 104 (e.g., historical radar events, historical radar event data, first data). The past radar events 104 may be stored in persistent storage accessible by a software function or hardware. The past radar events 104 may include different entries associated with a single radar strike, such as a channel identifier (or frequency) of each channel affected by the radar strike, a date or time (e.g., timestamp), and an amount of time on each of the affected channels before or during the strike.

The radar event comparison 102 is performed on segments of channels 106. A segment is a combination of channels within a bonded channel that has a bandwidth smaller than the bonded channel. Unless otherwise noted in the present disclosure, a segment includes multiple channels (e.g., a combination of channels) and has a bandwidth of at least 40 MHz. In some embodiments, a segment of the bonded channel 106 may be considered a combination of channels. For an exemplary embodiment, if a bonded channel configuration indicates a bandwidth of 160 MHz between channel 100 (5490-5510 MHz) and channel 128 (5630-5650 MHz), a corresponding bonded channel may include two segments of four channels each. The first segment may include channels 100, 104, 108, and 112 and the second segment may include channels 116, 120, 124, and 128.

Both the past radar events 104 and the segments of channels 106 are used to select a segment (e.g., a combination of channels) at block 108 to send to the interference comparison 110. At the block 108, a radar strike score may be calculated for each radar strike of the past radar events 104. The radar strike score may be calculated based on chronological recency—i.e., to favor more recent radar strikes. For example, a radar strike that occurred yesterday would be weighted heavier than a radar strike that happened a week ago. The radar strike score may also be calculated to favor the time on the channel before the strike. For example, a radar strike affecting a channel after five minutes of transmission time would be weighted heavier than a radar strike affecting the channel after 24 hours of transmission time. The following first equation (1) is an exemplary embodiment of generating a radar strike score weighted based on chronological recency:

$$\text{strike\_score} = 100 * (0.9)^{(DaysSinceStrike)} * TimeFactor, \tag{1}$$

where TimeFactor is one of a fixed weighting factors based on a time range, and DaysSinceStrike is a number of days since the radar event occurred. By weighting radar strike scores with these weighting factors, the radar event comparison 102 generates weighted radar strike scores.

For example, the TimeFactor can be determined based on the amount of time operating on a channel (duration on channel) based on the following scheme:

TimeFactor=1.25 if hours on channel<1;

TimeFactor=1 if hours on channel>=1 and <6;

TimeFactor=0.85 if hours on channel>=6 and <24;

TimeFactor=0.75 if hours on channel>=24 and <72; or

TimeFactor=0.65 if hours on channel>=72.

Alternatively, other weighting factors can be used for different time ranges.

Using the scheme above, the score of a strike can initially be between [65,125] and after one day the score will be between [58.5,112.5], two days between [52.65,101.25], and so on until a score is insignificant. In other embodiments, other exponential decay functions, constants, scalers, and weighting factors for the TimeFactor can be used.

By adding the TimeFactor, strikes that occurred after being on the channel for a longer time are not scored as high and do not affect the total score as much. Similarly, strikes that occur within an hour of being on the channel indicate a highly utilized DFS channel and make the score higher. It should be noted that by raising a constant to DaysSinceStrike$_{(0.9)}^{(DaysSinceStrike)}$, the equation ensures that older data is degraded and not weighed as much.

Once radar strike scores are calculated for each of the past radar events 104, an additional calculation may be made to determine which channels are a higher risk to an experience a radar strike in the future. This calculation can be made by summing or combining the radar strike scores associated with a channel, as depicted in a second equation (2):

$$\text{Channel\_score} = \text{sum(strikes in channel)}. \quad (2)$$

Once radar strike channel scores are calculated, a third calculation may be made to determine which segment of the segments of channels 106 is the least likely to experience a future radar strike. This third calculation can be made by averaging the radar strike channel scores of each channel within a given segment to calculate a radar strike segment score. For example, if a segment includes channels 116, 120, 124, and 128 and (i) channel 116 has a radar strike channel score of 50, (ii) channel 120 has a radar strike channel score of 100, (iii) channel 124 has a radar strike channel score of 150, and (iv) channel 128 has a radar strike channel score of 600, the radar strike segment score for the segment would be 200.

The segment with the lowest radar strike segment score is then selected for interference analysis (e.g., sent to or selected by the interference comparison 110). The interference comparison 110 takes into account historical interference data. Historical interference data may indicate, for each channel available to the WLAN, an amount of interference observed on a respective channel over a period of time. Each amount of interference observed on the respective channel may be represented by a past interference score 112. Each channel available to the WLAN may have multiple past interference scores 112. For example, the historical interference data may include ten (10) past interference scores 112 that indicate an amount of interference observed on the respective channel over different periods of time (e.g., different days).

The past interference scores 112 may be stored in persistent storage accessible by a software function or hardware. The past interference scores 112 may indicate an amount of interference within a channel over a period of time. Interference within a WiFi® channel may occur when two or more radio waves operating at or near the same frequency overlap and disrupt the communication by causing the signals to degrade or lose integrity. Interference can result from various sources, such as overlapping transmissions from nearby WiFi® networks, electronic devices, or physical obstructions that reflect or absorb the signals. The past interference scores 112 may also take into account noise and utilization. Noise may be any unwanted or disruptive electromagnetic signals that interfere with the transmission and reception of data in a wireless network, such as a WiFi® network. Utilization may be an amount of time that a channel of the WiFi® network is used to wirelessly transmit data. In some embodiments, utilization may be represented by a percentage equal to an amount of time the channel is used to transmit data over an amount of time that the channel is available to transmit data. In one embodiment, the past interference scores 112 may indicate an amount of interference observed on a channel over a course of a day (e.g., 24 hours). In another embodiment, the past interference scores 112 may indicate an amount of interference observed on a channel over a different time period or multiple time periods.

The interference comparison 110 also takes into account a selected segment 114. A channel from the selected segment 114 may be selected to be the control channel for the bonded channel at block 116. The selected segment 114 is the segment selected at the block 108 of the radar event comparison 102. The selected segment 114 has multiple channels, as described above. For example, the selected segment 114 may have four channels. Each of the four channels has one or more corresponding past interference scores 112. At the block 116, the interference comparison 110 uses the past interference scores 112 to select the control channel from the four channels based on which channel has the lowest amount of historical interference. In one embodiment, the interference comparison 110 generates average interference scores by aggregating or averaging all past interference scores 112 corresponding to each channel. The interference comparison 110 then selects the channel with the lowest average interference score to be the control channel. In another embodiment, the interference comparison 110 may compare a single past interference score for each channel to select the control channel.

As an example, (i) channel 116 has past interference scores 112 of 0.10, 0.20, and 0.06, (ii) channel 120 has past interference scores 112 of 0.05, 0.10, and 0.30, (iii) channel 124 has past interference scores 112 of 0.5, 0.4, and 0.3, and (iv) channel 128 has past interference scores 112 of 0.25, 0.3, and 0.35. In this example, (i) channel 116 has an averaged past interference score of 0.12, (ii) channel 120 has an averaged past interference score of 0.15, (iii) channel 124 has an averaged past interference score of 0.4, and (iv) channel 128 has an averaged past interference score of 0.3. Under this example, the interference comparison 110 may select channel 116 as the control channel as it has the lowest averaged interference score of the four channels.

As depicted above, (i) the radar event comparison 102 selects a segment of the bonded channel based on past radar events (e.g., historical strike data), and (ii) the interference comparison 110 selects a channel of that segment based on past interference scores (e.g., historical interference data) to be a control channel for the bonded channel. However, the radar event comparison 102 and the interference comparison 110 may be implemented other ways, such as (i) the interference comparison 110 selecting the segment of the bonded channel based on past interference scores and (ii) the radar event comparison 102 selecting a channel of that segment to be the control channel for the bonded channel. The radar event comparison 102 and the interference comparison 110 may also be combined to allow for a hybrid approach where both past radar events 104 and past interference scores 112 may be concurrently considered when determining a control channel.

Figure 2:
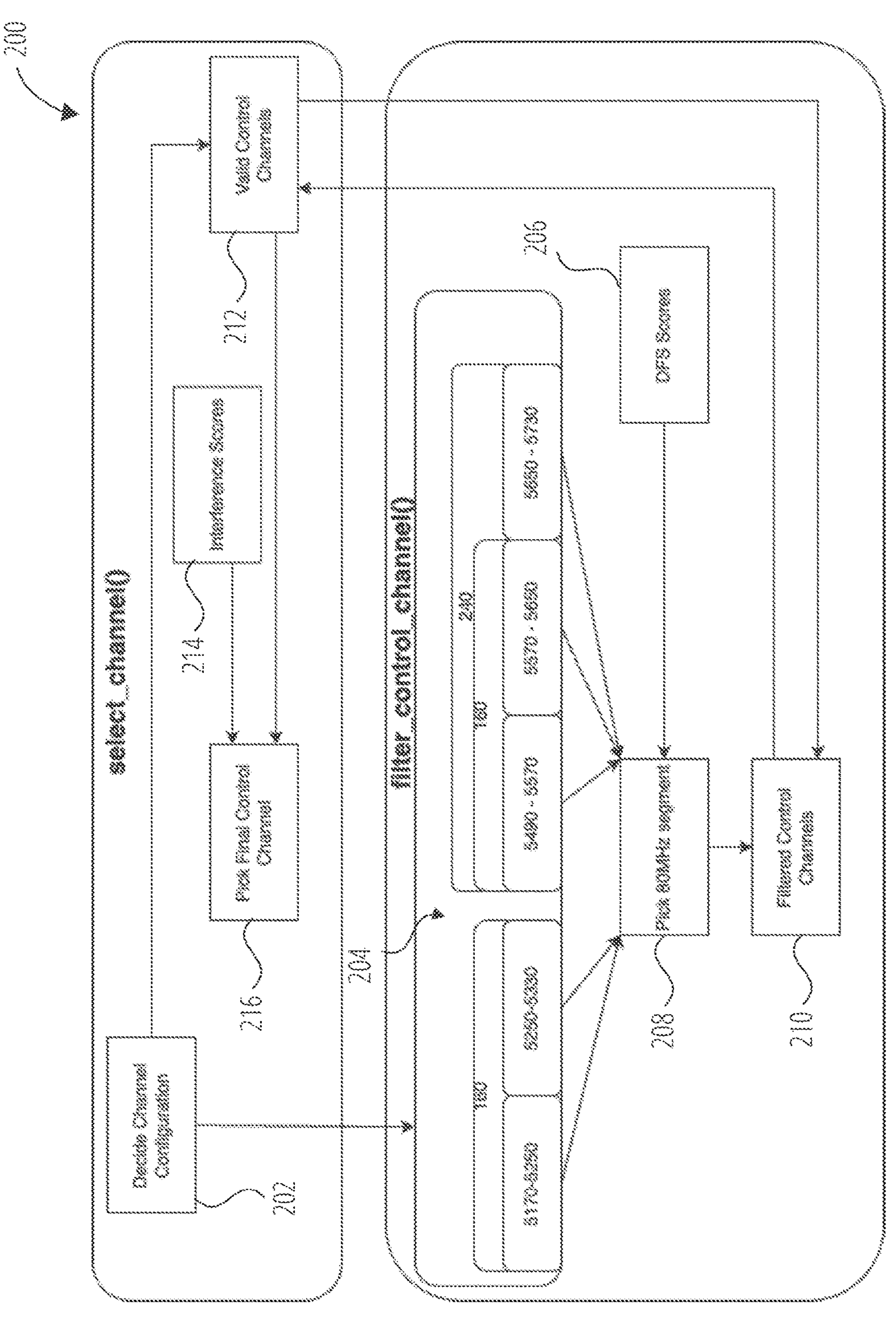
FIG. 2 is a block diagram of the control channel selection of FIG. 1, according to one embodiment.

FIG. 2 is a block diagram 200 of the control channel selection 100, according to one embodiment. While illustrated and described as functions, the operations of block diagram 200 may be implemented by processing logic comprising hardware, software, firmware, or any combination thereof. The block diagram 200 may include a channel configuration block 202, frequency ranges 204, radar strike scores 206, a segment selection block 208, a filtering block 210, a validation block 212, interference scores 214, and a control channel selection block 216. In some embodiments, the select_channel( ) function may include some or all of the features of the interference comparison 110 and the filter_control_channel( ) function may include some or all of the features of the radar event comparison 102 as described above in FIG. 1.

The channel configuration block 202 determines a bonded channel configuration, as described above with respect to FIG. 1. The bonded channel configuration may indicate one or more of (i) a target bandwidth or (ii) a specific bonded channel. If the bonded channel configuration indicates a specific bonded channel, a control channel is to be selected (e.g., via control channel selection 100) as one of the channels within the specific bonded channel. A bonded channel is multiple in-series channels that are combined into a single, larger bandwidth channel. The bonded channel configuration may indicate a bandwidth of 160 MHz, 240 MHz, or another bandwidth that is a multiple a smallest channel bandwidth (e.g., 20 MHz). The processor may then determine one or more frequency ranges of the frequency ranges 204 that is able to accommodate the bonded channel configuration. For example, if the bonded channel configuration has a bandwidth of 160 MHz, either of the frequency ranges of 5170-5330 MHz or 5490-5570 MHz may be used for the bonded channel. In one embodiment, each of these frequency ranges may be broken into 80 MHz segments (e.g., 5170-5250 MHz, 5250-5330 MHz, 5490-5570 MHz, and 5570-5650 MHz) and analyzed in the segment selection block 208. In another embodiment, only segments of one of the 160 MHz ranges may be analyzed by the segment selection block 208.

The radar strike scores 206 may be similar to the past radar events 104 as described above with respect to FIG. 1. The segment selection block 208 may use the radar strike scores 206 to select a segment of a frequency range that has a lower risk of experiencing a radar strike. The filtering block 210 and validation block 212 then verify that the selected segment has channels available as control channels. Channels may be unavailable as control channels for a variety of reasons, such as regulatory restrictions (e.g., Federal Communications Commission (FCC) regulation or WiFi® standards) or network configuration and management considerations (e.g., network architecture or types of devices on WiFi® network). All channels of the selected segment that are available as control channels are then analyzed at the control channel selection block 216 based on their corresponding interference scores 214. The control channel may be selected at the control channel selection block 216 in a manner that is the same as or similar to the interference comparison 110 of FIG. 1.

In some embodiments, the channel configuration block 202 may actually select the bonded channel. In these embodiments, the segment selection block 208 may only consider segments that are within the selected bonded channel. For example, if the channel configuration block 202 selected a 160 MHz bonded channel including 5490-5650 MHz (i.e., channels 100, 104, 108, 112, 116, 120, 124, and 128), the segment selection block 208 would select either a first segment including 5490-5570 MHz (i.e., channels 100, 104, 108, and 112) or a second segment (i.e., channels 116, 120, 124, and 128).

In other embodiments, the channel configuration block 202 only identifies a target bandwidth for a bonded channel. In these embodiments, the segment selection block 208 may consider segments that are within any possible bonded channel configuration. For example, if the channel configuration block 202 identifies a target bandwidth of 160 MHz for a bonded channel, the segment selection block 208 may consider two segments within a first possible bonded channel between 5170-5330 MHz (i.e., a first segment between 5170-5250 MHz and a second segment between 5250-5330 MHz) and two more segments within a second possible bonded channel between 5490-5650 MHz (i.e., a third segment between 5490-5570 MHz and a fourth segment between 5570-5650 MHz). In these embodiments, the bonded channel may be selected based on which segment is selected by the segment selection block 208. In at least some of these embodiments, the bonded channel may be selected only after historical interference of channels of the segment selected by the segment selection block 208 have been analyzed as described above with respect to the interference comparison 110 of FIG. 1.

FIG. 3 illustrates a method 300 of selecting a control channel, according to one embodiment. The method 300 may be implemented by processing logic comprising hardware, software, firmware, or a combination thereof. The processing logic may be a processing device, a computing device, a wireless device, or other devices described herein. In at least one embodiment, a wireless device part of a WLAN performs the method 300, such as wireless device 504 of FIG. 5, wireless device 706 of FIG. 7, or wireless device 800 of FIG. 8. Alternatively, the method 300 can be performed by other devices.

At block 302, the processing logic determines, using first data representing historical radar events having occurred on one or more dynamic frequency selection (DFS) channels within each channel of a combination of channels, a first score for a first combination of channels. The first score may represent a likelihood of a subsequent (e.g., future) radar event (e.g., radar strike) occurring within the first combination of channels. At block 304, the processing logic determines, using the first data, a second score for a second combination of channels. The second score may represent a likelihood of a subsequent radar event (e.g., radar strike) occurring within the second combination of channels. At block 306, the processing logic determines, using the first score and the second score, that a radar event is less likely to occur within the first combination of channels than the second combination of channels. At block 308, the processing logic determines, using second data representing amounts historical interference occurring on each channel within each of the combination of channels, a third score for a first channel of the first combination of channels. The third score may represent an aggregation or average of past interference observed within the first channel. At block 310, the processing logic identifies, using the third score, a channel of one of the combination of channels for a control channel for a third combination of channels comprising the first combination of channels and the second combination of channels. The processing logic may identify the first channel or a different channel for the control channel.

Figure 4:
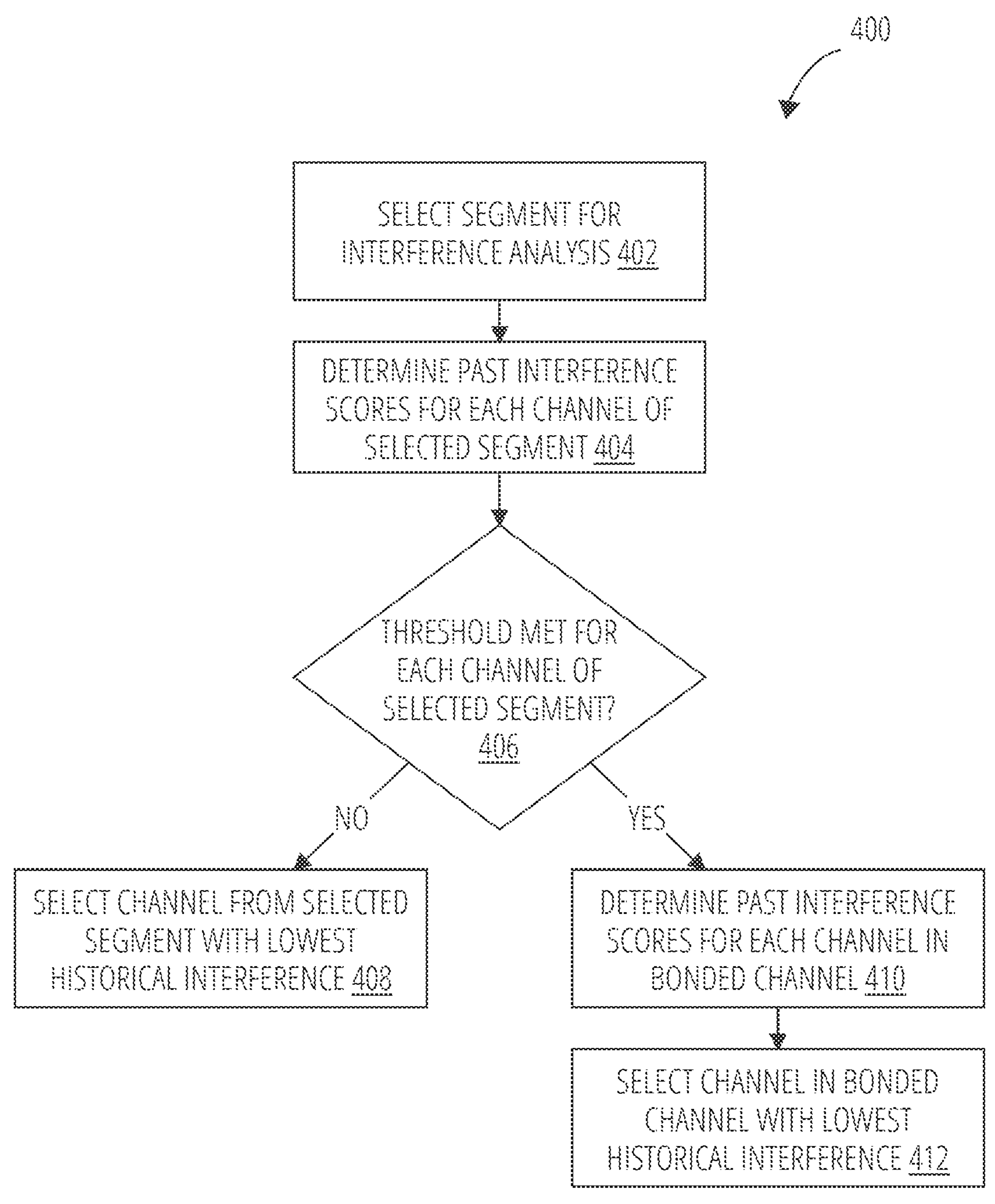
FIG. 4 is a flow diagram of an embodiment of selecting a control channel, according to one embodiment.

FIG. 4 is a flow diagram 400 of an embodiment of selecting a control channel, according to one embodiment. The flow diagram 400 may be implemented by hardware, software, firmware, or a combination thereof. In at least one embodiment, the flow diagram 400 is performed by a processing logic comprising hardware, software, firmware, or a combination thereof. The processing logic may be a processing device, a computing device, a wireless device, or other devices described herein. In at least one embodiment, a wireless device performs the operations of the flow diagram 400, such as wireless device 504 of FIG. 5, wireless device 706 of FIG. 7, or wireless device 800 of FIG. 8. Alternatively, the operations of the flow diagram 400 can be performed by other devices.

At block 402, the processing logic selects a segment for interference analysis. The processing logic may select a segment as described above with respect to the radar event comparison 102 of FIG. 1. The segment may be selected from segments that are able to conform to a bonded channel configuration, as described with respect to the channel configuration block 202 and frequency ranges 204 of FIG. 2. In some embodiments, the segment may include four channels and have bandwidth of 80 MHz.

At block 404, the processing logic may determine past interference scores (e.g., historical interference scores) for each channel of a selected segment. The interference scores may be as described with respect to the past interference scores 112 of FIG. 1 and the interference scores 214 of FIG. 2.

At block 406, the processing logic may determine whether a threshold has been met for each channel of the selected segment of block 402. Here, the processing logic compares past interference scores of the channels to an interference threshold (e.g., predetermined threshold). The interference threshold may be set to avoid selecting a channel for the control channel with substantial interference (e.g., interference, noise, and utilization). In some embodiments, a channel may have substantial interference if the interference would substantially hinder normal operations or tasks performed by a control channel. In at least one embodiment, historical interference data may be used to generate an interference threshold that defines a certain amount of interference as being substantial. For example, the interference threshold may be generated such that twenty percent (20%) of channels would be considered to have historically experienced substantial interference. In another example, the interference threshold may be generated such that a channel is considered to have historically experience substantial interference if the historical data indicates that the channel would (i) not be able to perform or (ii) substantially hinder normal operations or tasks of a control channel.

If the processing logic determines that each channel within the selected segment has historically had substantial interference (e.g., meets the interference threshold), the processing logic will determine interference scores for channels outside of the selected segment at block 410 and select a channel of the bonded channel for the control channel with a lowest historical interference at block 412. If the processing logic determines that at least one channel does not meet the interference threshold, the processing logic will select a channel of the selected segment for the control channel at block 408.

Different embodiments may utilize past interference scores differently in determining whether the interference threshold is met for each channel of the selected segment. In some embodiments, where each channel has multiple corresponding past interference scores, the processing logic may calculate an averaged past interference score for each channel (as described in FIG. 2) and compare the averaged past interference scores to the interference threshold. In these embodiments, responsive to a determination that each averaged past interference score meets the interference threshold, block 406 is satisfied and the processing logic may move on to block 410. If at least one averaged past interference score does not meet the predetermined threshold, block 406 is not satisfied and the processing logic moves to block 408. In other embodiments, block 406 is satisfied if only a subset (e.g., two of four, three of four) of the averaged past interference scores is above the interference threshold.

In some embodiments, the processing logic may compare (i) the averaged past interference score to the interference threshold and (ii) individual past interference scores to a higher threshold. Individual past interference scores may be compared to the higher threshold to avoid channels with a likelihood of experiencing high enough interference or noise to cause normal operations of a control channel difficult or impossible. In these embodiments, if each channel either (i) has an averaged past interference score that meets the interference threshold or (ii) has an individual past interference score that meets the higher threshold, block 406 is satisfied and the processing logic may move on to block 410. If not, block 406 is not satisfied and the processing logic moves to block 408.

At block 408, the processing logic selects a channel of the selected segment with the lowest historical interference. The processing logic may compare the averaged past interference scores to determine which channel of the selected segment has the lowest historical interference. The processing logic may select a channel with the lowest historical interference as described above with respect to the interference comparison 110 of FIG. 1.

At block 410, the processing logic determines past interference scores for channels outside of the selected segment. In one embodiment, the processing logic may determine past interference scores for every channel outside of the selected segment. In another embodiment, the processing logic may only determine past interference scores for a portion of the channels outside of the selected segment.

At block 412, the processing logic compares the past interference scores determined at blocks 404 and 406 and selects a channel for a control channel that has the lowest historical interference. Here, the processing logic may select a channel inside or outside of the selected segment. In some embodiments, the processing logic compares averaged past interference scores and determines which channel corresponds to the lowest averaged past interference score.

Figure 5:
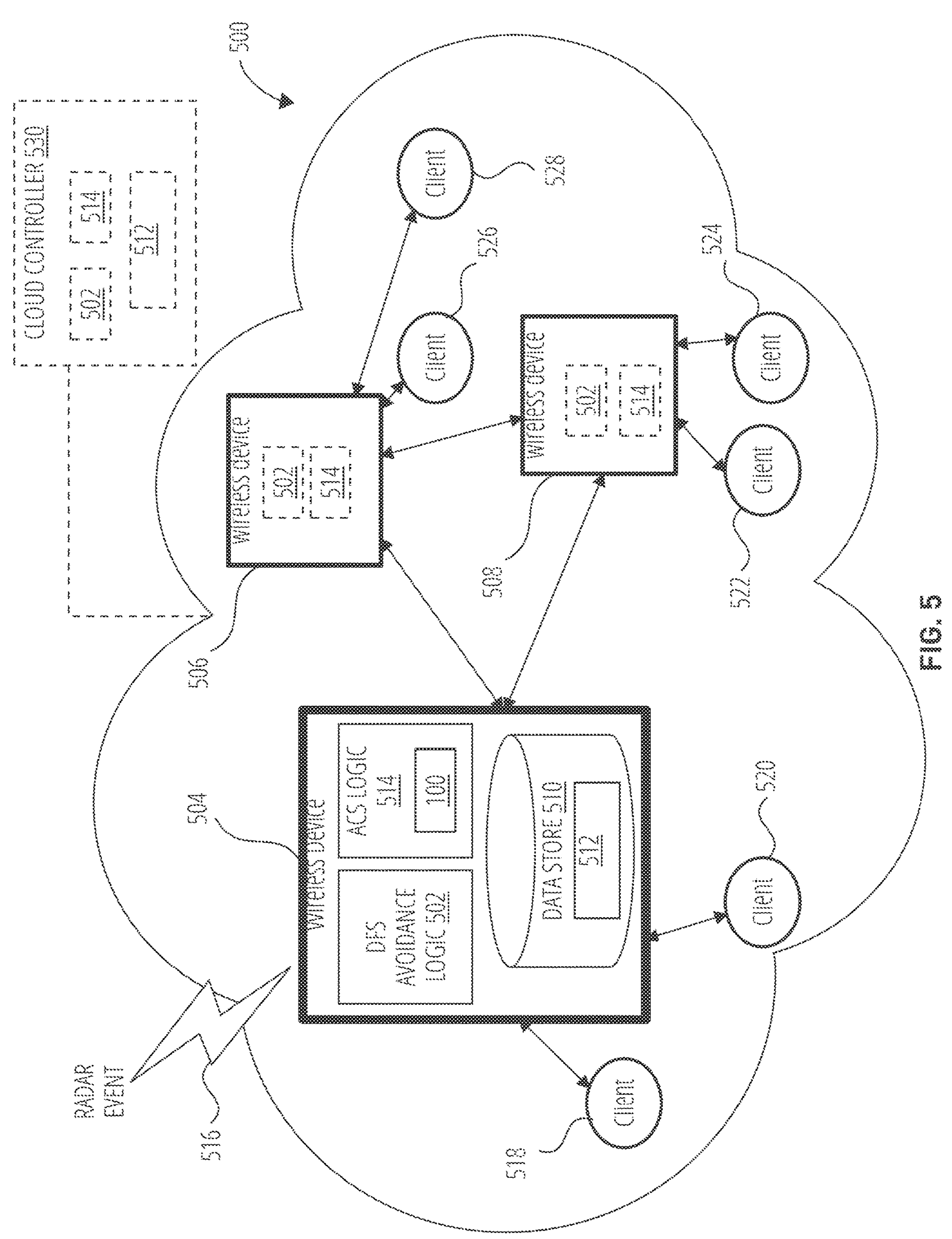
FIG. 5 is a network diagram of wireless devices in a wireless network with DFS avoidance logic for channel selection based on historical radar events stored locally in the WLAN, according to at least one embodiment.

FIG. 5 is a network diagram of wireless devices in a wireless network 500 (e.g., part of a WLAN) with DFS avoidance logic 502 and ACS logic 514 for control channel selection based on historical radar data 512 stored locally in the WLAN, according to at least one embodiment. The ACS logic 514 may include the control channel selection 100 of FIG. 1. The past radar events 104, radar strike scores 206, and the historical radar data 512 may be the same or similar. The wireless network 500 includes a first wireless device 504, a second wireless device 506, and a third wireless device 508. Each of the wireless devices 504, 506, 508 can be access point (AP) devices in the wireless network 500 and can provide network access to one or more endpoint devices (also referred to as client devices), such as client devices 518, 520, 522, 524, 526, and 528, respectively. Alternatively, the wireless devices 504, 506, and 508 can be endpoint devices that are not connected to downstream devices. The first wireless device 504 includes one or more processors, one or more radios, and a data store 510. In at least one embodiment, the wireless network 500 is a WLAN, and the first wireless device 504 includes a WLAN radio. Alternatively, the wireless network 500 is another type of wireless network in which DFS channels are available.

The first wireless device 504 includes DFS avoidance logic 502 and ACS logic 514. In at least one embodiment, the DFS avoidance logic 502 is stored as a set of instructions in a memory device of the wireless device 504. The DFS avoidance logic 502 may include progressive DFS avoidance processes. Alternatively, the first wireless device 504 includes processing logic comprising hardware, software, firmware, or any combination thereof to perform the operations of the DFS avoidance. In at least one embodiment, the ACS logic 514 is a set of instructions in a memory device of the wireless device 504. The ACS logic 514 may include instructions related to control channel selection as described in FIGS. 1-4. For example, as illustrated, the ACS logic 514 may include the control channel selection 100. Alternatively, the first wireless device 504 includes processing logic comprising hardware, software, firmware, or any combination thereof to perform the operations of the control channel selection. The wireless device 504 has DFS capability to detect a radar event 516. The DFS avoidance logic 502 can store information about the radar event 516 in historical radar data 512 in data store 510. Storing the historical radar data 512 locally in the wireless network 500 can be used by ACS logic 514 to improve control channel selection. The wireless device 504 can share the historical radar data 512 with the other wireless devices 506 and 508. The wireless devices 506 and 508 can also include instances of DFS avoidance logic 502 and ACS logic 514. In at least one embodiment, the historical radar data 512 includes, for each historical radar event detected in the wireless network 500, a timestamp of the respective radar event and a first amount of time operating on a bonded channel before the respective historical radar event. In a further embodiment, the historical radar data 512 further includes, for each historical radar event detected in the wireless network 500, channel identifiers and a bandwidth of the bonded channel associated with the respective historical radar event. In at least one embodiment, the DFS avoidance logic 502 can store a list of radar events. Table 1 includes an example List of Radar Strikes.

TABLE 1

List of Radar Strikes

| Channels | Operating Bandwidth | Radar Timestamp | Time On Bonded Channel |
|---|---|---|---|
| 52 | 20 | 1611079571 | 4 |
| 56 | 20 | 1611059572 | 1 |
| 60, 64 | 40 | 1611039576 | .25 |
| 116, 120, 124, 128 | 80 | 1611019578 | 26 |
| 52, 56, 60, 64 | 160 | 1611019568 | 74 |
| 100, 104, 108, 112, 116, 120, 124, 128 | 160 | 1611019572 | 14 |

In at least one embodiment, the List of Radar Strikes list includes i) identifiers of the affected DFS channels; ii) a first value indicating a bandwidth of the bonded channel (e.g., 80 MHz, 160 MHz, 240 MHz, 320 MHz, 320 MHz punctured); iii) timestamp data of a respective radar event on the respective bonded channel, and iv) an amount of time operating on the respective bonded channel before the respective radar event. The DFS avoidance logic 502 can store the List of Radar Strikes and send the List to other devices. In at least one embodiment, the DFS avoidance logic 502 can share one or more entries or an entire copy of the List of Radar Strikes to other devices in the network, such as by broadcasting the List of Radar Strikes in an information element of a data frame. Alternatively, the DFS logic 502 can share the information of the List of Radar Strikes in other ways.

In at least one embodiment, the first wireless device 504 includes a wireless radio coupled to a processor. As described above, the data store 510 can store, for each historical radar event detected in the wireless network 500, a timestamp of the respective radar event and a first amount of time operating on a bonded channel before the respective historical radar event.

In at least one embodiment, the first wireless device 504 includes a DFS server programmed to operate the first wireless device 504 as a DFS group leader. In at least one embodiment, the DFS server is stored as a set of instructions in a memory device of the first wireless device 504. Alternatively, the first wireless device 504 includes processing logic comprising hardware, software, firmware, or any combination thereof to perform the operations of the DFS group leader. The DFS group leader provides a DFS service to multiple devices in a DFS coverage area, as described below. The other devices, including wireless devices 506, 508, 518, 520, 522, 524, 526, and 528, can be located in the same building as the first wireless device 504. The wireless devices 506, 508, 518, 520, 522, 524, 526, and 528 can each include a DFS client that communicates with the DFS group leader. In at least one embodiment, the DFS group leader is a standalone device responsible for performing background channel availability checks (CACs) for one or more DFS channels for use within a bonded channel. Background CACs may be performed during normal operations of the wireless device 504. In at least one embodiment, the DFS server can store a DFS channel list. The DFS channel list may be updated periodically or in real time as background CACs are performed. The DFS channel list may include i) an identifier of the respective DFS channel (e.g., 52, 56, 60, . . . , 144); ii) a value indicating a duration of a channel availability check (CAC) specified for the respective DFS channel; iii) first timestamp data of a last background CAC performed on the respective DFS channel; and iv) second timestamp data of a last radar event on the respective DFS channel. The DFS server can update the first timestamp data after performing a CAC on the respective DFS channel. The DFS server can store the DFS channel list for providing to other DFS clients. In at least one embodiment, the DFS server can broadcast the DFS Channel List in an information element of its beacon frame, such as over the 2.4 GHz frequency band. In at least one embodiment, the DFS server can be queried via a port of the first wireless device 504. For example, a DFS client connected to the DFS group leader via a wired connection can request the DFS Channel List from a User Datagram Protocol (UDP) port of the DFS group leader. In at least one embodiment, the DFS client can send the request via the wired connection and receive a response via the wired connection. In at least one embodiment, the DFS client can send the request via the wired connection and receive a response via a wireless connection.

In another embodiment, a radar event can be detected by any one of the wireless devices in the wireless network and reported to a cloud controller 530 (or other types of centralized controllers inside or outside of the wireless network 500. The cloud controller 530 can include the DFS avoidance logic 502, the ACS logic 514, the data store 510 storing the historical radar data 512, or any combination thereof to facilitate DFS avoidance for channel selection. In the event that multiple wireless devices (e.g., 506, 508, 518, 520, 522, 524, 526, and 528) are located close in proximity, causing the cloud controller 130 to perform the control channel selection 100 may be beneficial.

Figure 6:
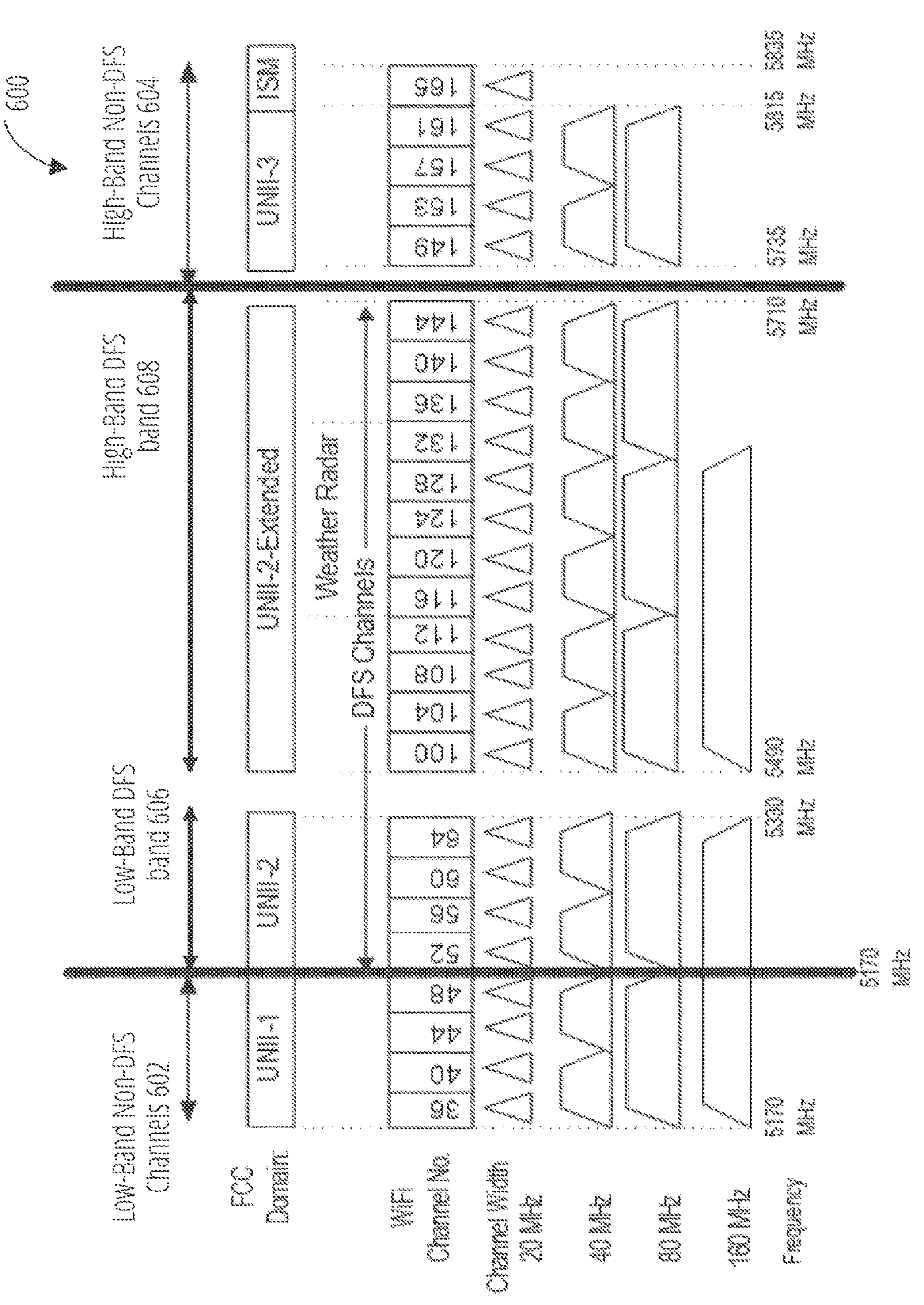
FIG. 6 is a graph that illustrates channel allocation by radios under a wireless local area network (WLAN) protocol including DFS channels and non-DFS channels, according to an embodiment.

FIG. 6 is a graph 600 that illustrates channel allocation by radios under a WLAN protocol, including DFS channels (in bands 606, 608) and non-DFS channels 602, 604, according to an embodiment. Across the top of the graph 600 are various UNII bands, which fall into Federal Communication Commission (FCC) regulated domains. The UNII-2 and UNII-2-Extended domains include DFS channels and overlapping channels for weather radar. Below the domain identifications are WiFi® channels, and below the WiFi® channels are illustrated potential communication link bandwidths that would subsume the above-identified WiFi® channels. For example, each discrete WiFi® channel spans over 20 MHz, and so any adjacent pair of channels spans 40 MHz, any series of four channels span 80 MHz, and any series of eight channels span 160 MHz. Channels in series may be combined to form bonded channels (i.e., channel bonding). Bonded channels increase the wireless network's bandwidth and data throughput, offering advantages such as faster data transmission rates and improved capacity for handling multiple concurrent users or high-bandwidth applications. While the illustrated channel allocation falls into FCC regulated domains, channel allocation may be different in different regions. The present disclosure may be adapted to any channel allocation falling under governmental regulations of different regions.

Although a radio may operate on one primary channel (e.g., channel (CH) 116), a radio can operate on a wider channel bandwidth, such as over 40, 80, or 160 MHz channel ranges. For many applications, a wider channel bandwidth, such as a bandwidth of a bonded channel, is desired to increase the wireless network's data throughput. In various embodiments, the operating channel bandwidth is fixed at a maximum channel bandwidth allowed by the WLAN protocol for sending and receiving data on a primary channel and one or more secondary channels between two devices (e.g., two mesh network device devices or between a client wireless device and a mesh network device). According to complementary embodiments, the bandwidth of the bonded channel is configured to a frequency range (e.g., if the desired bandwidth is 240 MHz, the bonded channel may be configured to the frequency range 5490-5730 MHz) and is adjustable by the radio to be identical to or lower than the operating channel bandwidth. Once the bonded channel has been configured to the frequency range, a wireless device (e.g., the wireless device 504) may initiate the control channel selection process as described with respect to FIG. 1.

Figure 7:
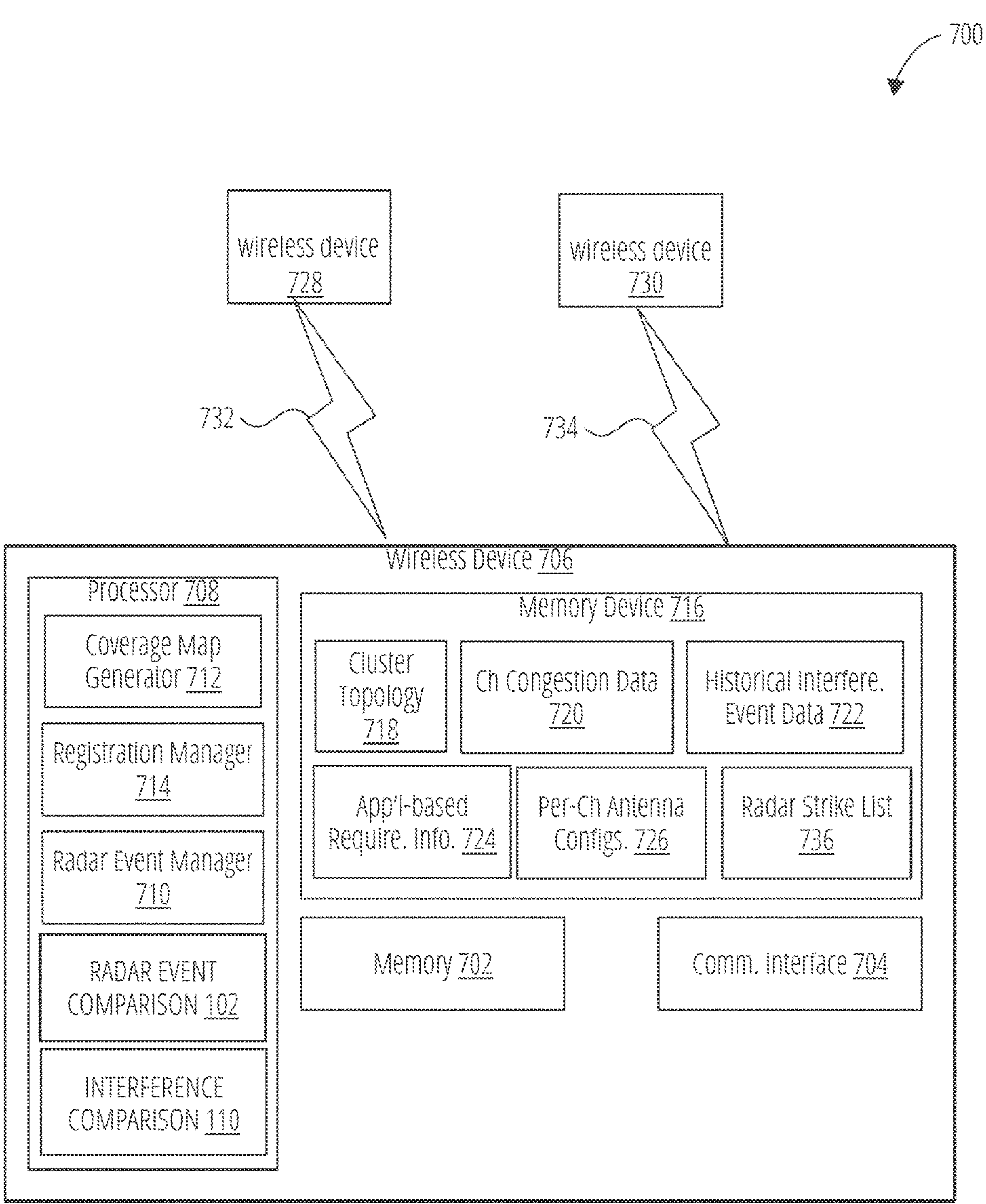
FIG. 7 is a block diagram of a wireless device with DFS avoidance logic for channel selection in a WLAN, according to at least one embodiment.

FIG. 7 is a block diagram of a wireless device 706 with DFS avoidance logic for channel selection in a WLAN 700 according to at least one embodiment. The wireless device 706 can be an AP device, a gateway device, a network device, a node, or the like. The wireless device 706 can communicate with other wireless devices 728, 730 in the WLAN 700 over wireless connections 732, 734. In various embodiments, the wireless device 706 may include memory 702, a communication interface 704, a processor 708, and a memory device 716. The communication interface 704, which may include one or more network devices for connecting to the Internet, may be adapted to also wirelessly couple the wireless device 706 to the wireless devices 728 and 730 and communicate data with the wireless devices 728 and 730 as described herein. The data received from the wireless devices 728 and 730 may include, for example, cluster topology information, such as node location, historical interference event data (e.g., which mesh network devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple mesh network devices communicate. The received data may further include information associated with, or useable to determine, pattern recognition and learning associated with radar event detection, data bandwidth requirements, latency requirements, and the like.

In embodiments, the memory device 716 includes data stored, which are related to channels of the mesh network devices and associated with cluster topology information 718 of the WLAN 700, channel congestion data 720, historical interference event data 722, historical application-based requirements information 724 (e.g., historical application-based throughput and latency requirements), per-channel antenna configurations 726, and a Radar Strike List 736 (e.g., past radar events 104, radar strike scores 206, or historical radar data 512). The memory device 716 can also store data to be used for the DFS service, including the DFS channels and fallback channels of the DFS channels. The wireless device 706 can be coupled to a public or private network (not illustrated) over an Internet or WAN connection. Such an Internet or WAN connection may include additional links or trunks, whether wired or wireless, that may involve other types of wideband communication, including those based on cellular standard(s).

In various embodiments, the processor 708 (e.g., processing device) includes a coverage map data manager 712, a registration manager 714, and a radar event manager 710. The coverage map data manager 712 can collect information from the devices to generate and maintain coverage map data for the DFS master service. The registration manager 714 can manage registration requests by other wireless devices (e.g., 728 and 730) interested in radar event notifications so that the wireless devices or endpoint device(s) can use the DFS channels. The wireless devices or endpoint device(s) may not have radar detection capability, but by registering with the registration manager 714, the wireless devices or endpoint device(s) can receive radar event notifications. The radar event manager 710 can receive notifications regarding radar events from the devices. The radar event manager 710 can assist the wireless devices or endpoint device(s) in receiving the radar event notifications when registered with the registration manager 714. It should be noted that the wireless devices or endpoint device(s) can receive the radar event notifications from the radar event manager 710 or other sources. In at least one embodiment, the processor 708 can perform the radar event comparison 102 and the interference comparison 110 as described with respect to FIG. 1. Instructions related to performing the radar event comparison 102 and the interference comparison 110 (e.g., the control channel selection 100) may be stored in the memory device 716. Although illustrated as instructions executed by the processor 708, the radar event comparison 102 and interference comparison can be implemented by software, hardware, firmware, or a combination thereof. For example, the wireless device 706 may include a state machine that utilizes circuitry and registers to perform the control channel selection 100.

Figure 8:
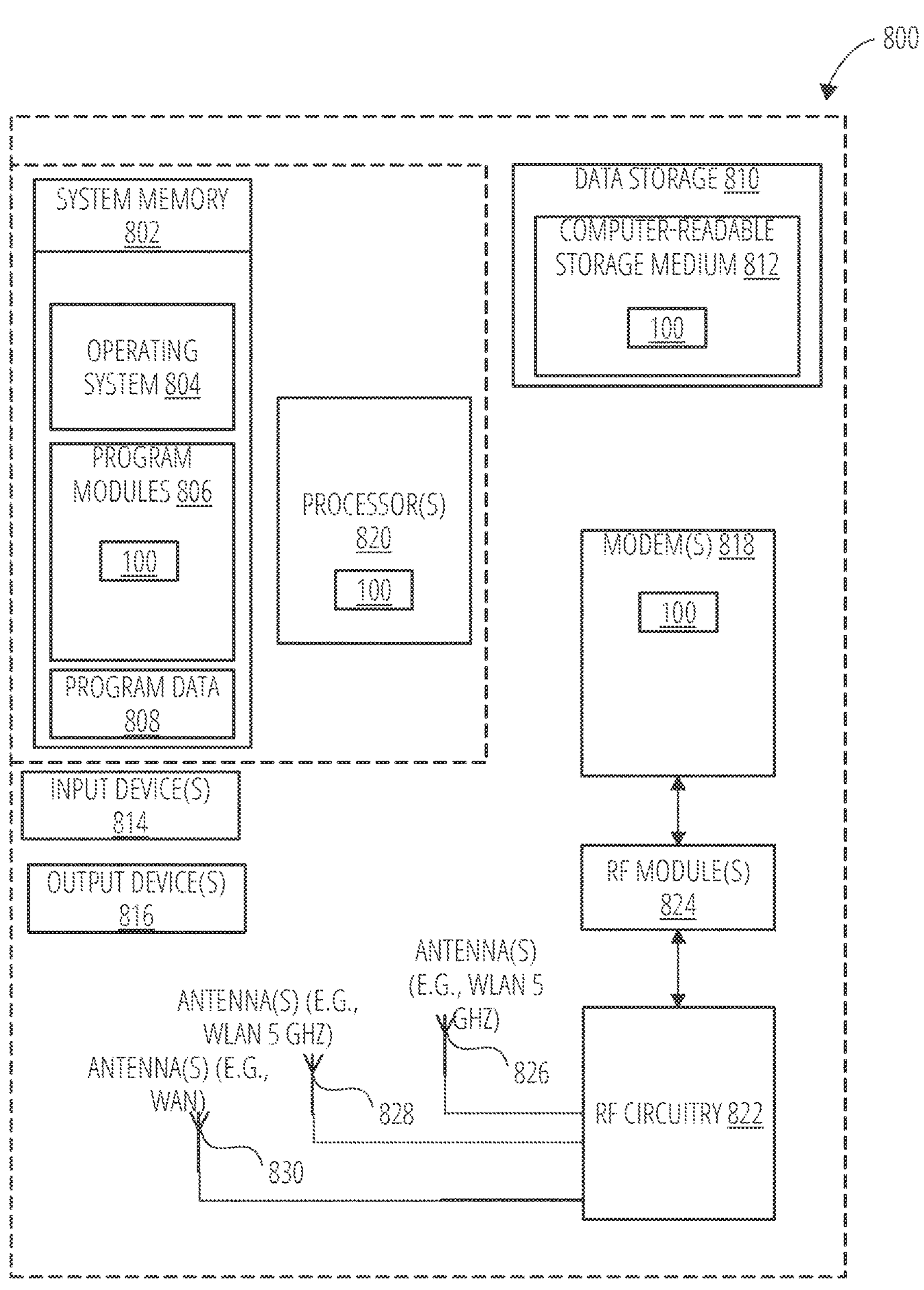
FIG. 8 is a block diagram of a wireless device with channel selection logic with DFS avoidance, according to one embodiment.

FIG. 8 is a block diagram of a wireless device 800 with logic to perform the control channel selection 100, according to one embodiment. The wireless device 800 may correspond to the wireless devices described above with respect to FIG. 5 and FIG. 7. Alternatively, the wireless device 800 may be other electronic devices, as described herein.

The wireless device 800 includes one or more processor(s) 820, such as one or more CPUs, microcontrollers, field programmable gate arrays, or other types of processors. The wireless device 800 also includes system memory 802, which may correspond to any combination of volatile and/or non-volatile storage mechanisms. The system memory 802 stores information that provides operating system 804, various program modules 806, program data 808, and/or other components. In one embodiment, the system memory 802 stores instructions of methods to control the operation of the wireless device 800. The wireless device 800 performs functions using the processor(s) 820 to execute instructions provided by the system memory 802. In one embodiment, the program modules may include control channel selection 100. The control channel selection 100 may perform some or all of the operations of the processes described herein with respect to FIGS. 1-2.

The wireless device 800 also includes a data storage device 810 that may be composed of one or more types of removable storage and/or one or more types of non-removable storage. The data storage device 810 includes a computer-readable storage medium 812, on which is stored one or more sets of instructions embodying any of the methodologies or functions described herein. Instructions for the program modules 806 (e.g., control channel selection 100) may reside, completely or at least partially, within the computer-readable storage medium 812, system memory 802, and/or within the processor(s) 820 during execution thereof by the wireless device 800, the system memory 802 and the processor(s) 820 also constituting computer-readable media. The wireless device 800 may also include one or more input devices 814 (keyboard, mouse device, specialized selection keys, etc.) and one or more output devices 816 (displays, printers, audio output mechanisms, etc.).

Although illustrated as instructions to be performed by processor(s) 820, the control channel selection 100 can be implemented by software, hardware, firmware, or a combination thereof. For example, in one embodiment, the wireless device 706 may include circuitry and registers to perform the control channel selection 100. The wireless device 800 may also include a state machine or a controller that uses the circuitry and registers to select a control channel.

The wireless device 800 further includes a modem 818 to allow the wireless device 800 to communicate via wireless connections (e.g., provided by the wireless communication system) with other computing devices, such as remote computers, an item-providing system, and so forth. The modem 818 can be connected to one or more radio frequency (RF) modules 824. The RF modules 824 may be a WLAN module, a WAN module, a PAN module, a GPS module, or the like. The antenna structures (antenna(s) 826, 828, 830) are coupled to the RF circuitry 822, which is coupled to the modem 818. The RF circuitry 822 may include radio front-end circuitry, antenna switching circuitry, impedance matching circuitry, or the like. The antennas 826 may be GPS antennas, NFC antennas, other WAN antennas, WLAN or PAN antennas, or the like. The modem 818 allows the wireless device 800 to handle both voice and non-voice communications (such as communications for text messages, multimedia messages, media downloads, web browsing, etc.) with a wireless communication system. The modem 818 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 818 may generate signals and send these signals to an antenna(s) 826 of a first type (e.g., WLAN 5 GHz), antenna(s) 828 of a second type (e.g., WLAN 2.4 GHz), and/or antenna(s) 830 of a third type (e.g., WAN), via Rf circuitry 822, and Rf module(s) 824 as descried herein. Antennas 826, 828, 830 may be configured to transmit in different frequency bands and/or using different wireless communication protocols. The antennas 826, 828, 830 may be directional, omnidirectional, or non-directional antennas. In addition to sending data, antennas 826, 828, 830 may also receive data, which is sent to appropriate RF modules connected to the antennas. One of the antennas 826, 828, 830 may be any combination of the antenna structures described herein.

In one embodiment, the wireless device 800 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the WMN, and the second wireless connection may be associated with serving a content file to a client consumption device, as described herein.

Though a modem 818 is shown to control transmission and reception via the antenna(s) (826, 828, 830), the wireless device 800 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of selecting a control channel of a first wireless device in a wireless local area network (WLAN), the method comprising:

determining, using historical radar event data, a first radar strike channel score for each channel of a first set of channels, wherein the first set of channels has at least one dynamic frequency selection (DFS) channel, wherein the historical radar event data comprises a first number of historical radar events having occurred on one or more channels of the first set of channels;

determining, using the first radar strike channel scores, a first radar strike segment score for the first set of channels, the first radar strike segment score representing a likelihood of a subsequent radar event occurring on the first set of channels;

determining, using the historical radar event data, a second radar strike channel score for each channel of a second set of channels, wherein the second set of channels has at least one DFS channel, wherein the historical radar event data further comprises a second number of historical radar events having occurred on one or more channels of the second set of channels, wherein the second set of channels does not overlap with the first set of channels;

determining, using the second radar strike channel scores, a second radar strike segment score for the second set of channels, the second radar strike segment score representing a likelihood of a subsequent radar event occurring on the second set of channels, wherein the first radar strike segment score is less than the second radar strike segment score;

identifying a bonded channel, wherein the bonded channel comprises the first set of channels;

determining, using historical interference data, a first average interference score for a first channel of the first set of channels and a second average interference score for a second channel of the first set of channels; and sending, on the first channel, management information associated with the bonded channel to a second wireless device in the WLAN.

2. The method of claim 1, wherein determining the first radar strike channel score for the first channel comprises:

determining, based on the historical radar event data, a first radar strike score and a second radar strike score each corresponding to the first channel of the first set of channels, wherein a first radar event corresponding to the first radar strike score occurred before a second radar event corresponding to the second radar strike score;

generating a third radar strike score by weighting the first radar strike score by a first weighting factor;

generating a fourth radar strike score by weighting the fourth radar strike score by a second weighting factor, wherein the second weighting factor is larger than the first weighting factor; and determining, using the third and fourth radar strike scores, the first radar strike channel score for the first channel.

3. The method of claim 1, wherein determining the first average interference score for the first channel of the first set of channels comprises:

determining, based on the historical interference data, a plurality of past interference scores that each represent an amount of interference observed on the first channel over a respective period of time; and determining, using the plurality of past interference scores, the first average interference score.

4. A method of operating a first wireless device that is part of a wireless local area network (WLAN), the method comprising:

determining, using historical radar event data associated with one or more dynamic frequency selection (DFS) channels, a first score for a first set of channels;

determining, using the historical radar event data, a second score for a second set of channels;

determining, using the first score and the second score, that a radar event is less likely to occur on the first set of channels than the second set of channels;

determining, using historical interference data, a third score for at least one channel of a first bonded channel comprising at least the first set of channels;

determining, using the third score for the at least one channel, a control channel from a plurality of channels of the first bonded channel; and sending, on the control channel, management information associated with the first bonded channel to a second wireless device of the WLAN.

5. The method of claim 4, wherein determining the first score comprises:

determining, using the historical radar event data, a fourth score for a first channel of the first set of channels, wherein the fourth score represents a likelihood of a radar event occurring on the first channel;

determining, using the historical radar event data, a fifth score for a second channel of the first set of channels, wherein the fifth score represents a likelihood of a radar event occurring on the second channel; and combining the fourth and fifth score.

6. The method of claim 5, wherein determining the fourth score comprises:

determining, using the historical radar event data, a first historical radar event and a second historical radar event each associated with a first channel of the first set of channels, wherein the first historical radar event is associated with a first time and the second historical radar event is associated with a second time;

generating, using a first weighting factor associated with the first time, a seventh score corresponding to the first historical radar event;

generating, using a second weighting factor associated with the second time, an eighth score corresponding to the second historical radar event; and combining the seventh and eighth scores.

7. The method of claim 4, wherein a second bonded channel comprises the second set of channels, and wherein the method further comprises selecting the first bonded channel responsive to determining that a radar event is less likely to occur on the first set of channels than the second set of channels.

8. The method of claim 4, wherein determining the third score comprises:

determining, using the historical interference data, a fourth score that represents an amount of interference having occurred on a first channel of the first set of channels over a first period of time;

determining, using the historical interference data, a fifth score that represents an amount of interference having occurred on the first channel over a second period of time; and combining the fourth score and the fifth score.

9. The method of claim 4, further comprising receiving a bonded channel configuration, wherein the bonded channel configuration indicates the first bonded channel, and wherein the first bonded channel comprises the second set of channels.

10. The method of claim 4, further comprising selecting, responsive to determining that a radar event is less likely to occur on the first set of channels than the second set of channels, the first bonded channel.

11. The method of claim 4, further comprising:

responsive to a determination that the third score meets a predetermined threshold:

determining, using the historical interference data, a fourth score for a second channel of the second set of channels;

determining, using the historical interference data, a fifth score for a third channel of the first set of channels; and determining that at least one of the third score and the fifth score is less than the fourth score.

12. The method of claim 4, further comprising:

determining, using the historical radar event data, a fourth score for a third set of channels; and determining, using the first score and the fourth score, that a radar event is less likely to occur within the first set of channels than the third set of channels.

13. A first wireless device that is part of a wireless local area network (WLAN), the first wireless device comprising:

a WLAN radio;

a memory device that stores data representing historical radar events and historical interference; and a processor coupled to the WLAN radio and the memory device, wherein the processor is to:

determine, using historical radar event data associated with one or more dynamic frequency selection (DFS) channels, a first score for a first set of channels;

determine, using the historical radar event data, a second score for a second set of channels;

determine, using the first score and the second score, that a radar event is less likely to occur on the first set of channels than the second set of channels;

determine, using historical interference data, a third score for at least one channel of a first bonded channel comprising at least the first set of channels;

determine, using the third score for the at least one channel, a control channel from a plurality of channels of the first bonded channel; and send, on the control channel, management information associated with the first bonded channel to a second wireless device of the WLAN.

14. The first wireless device of claim 13, wherein to determine the first score, the processor is to:

determine, using the historical radar event data, a fourth score for a first channel of the first set of channels, wherein the fourth score represents a likelihood of a radar event occurring on the first channel;

determine, using the historical radar event data, a fifth score for a third channel of the first set of channels, wherein the fifth score represents a likelihood of a radar event occurring on the third channel of the first set of channels; and combine the fourth and fifth score.

15. The first wireless device of claim 14, wherein to determine the fourth score, the processor is to:

determine, using the historical radar event data, a first historical radar event and a second historical radar event each associated with a first channel of the first set of channels, wherein the first historical radar event is associated with a first time and the second historical radar event is associated with a second time;

generate, using a first weighting factor associated with the first time, a seventh score corresponding to the first historical radar event;

generate, using a second weighting factor associated with the second time, an eighth score corresponding to the second historical radar event; and combine the seventh and eighth scores.

16. The wireless device of claim 13, wherein a second bonded channel comprises the second set of channels, and wherein the processor is further to select the first bonded channel responsive to determining that a radar event is less likely to occur on the first set of channels than the second set of channels.

17. The first wireless device of claim 13, wherein to determine the third score, the processor is to:

determine, using the historical interference data, a fourth score that represents an amount of interference having occurred on a first channel of the first set of channels over a first period of time;

determine, using the historical interference data, a fifth score that represents an amount of interference having occurred on the first channel over a second period of time; and combining the fourth score and the fifth score.

18. The first wireless device of claim 13, wherein the processor is further to receive a bonded channel configuration, wherein the bonded channel configuration indicates the first bonded channel, and wherein the first bonded channel comprises the second set of channels.

19. The first wireless device of claim 13, wherein the processor is further to:

responsive to a determination that the third score meets a predetermined threshold:

determine, using the historical interference data, a fourth score for a second channel of the second set of channels;

determine, using the historical interference data, a fifth score for a third channel of the first set of channels; and determine that at least one of the third score and the fifth score is less than the fourth score.

20. The first wireless device of claim 13, wherein the processor is further to:

determining, using the historical radar event data, a fourth score for a third set of channels; and determining, using the first score and the fourth score, that a radar event is less likely to occur within the first set of channels than the third set of channels.

* * * * *